(12) United States Patent
Otowa et al.

(10) Patent No.: US 9,986,449 B2
(45) Date of Patent: *May 29, 2018

(54) MOBILE TERMINAL TEST DEVICE AND METHOD

(71) Applicant: ANRITSU CORPORATION, Kanagawa (JP)

(72) Inventors: Toshiya Otowa, Kanagawa (JP); Naofumi Naruse, Kanagawa (JP); Hirofumi Tsujimura, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/076,335

(22) Filed: Nov. 11, 2013

(65) Prior Publication Data
US 2014/0162630 A1 Jun. 12, 2014

(30) Foreign Application Priority Data

Dec. 12, 2012 (JP) ................................. 2012-270963

(51) Int. Cl.
H04W 24/06 (2009.01)
(52) U.S. Cl.
CPC .................................. H04W 24/06 (2013.01)
(58) Field of Classification Search
CPC ...... H04W 24/06; H04W 24/10; H04W 24/00
See application file for complete search history.

(56) References Cited

U.S. PATENT DOCUMENTS

| 7,177,600 | B2 | 2/2007 | Kang et al. |
| 2004/0093135 | A1* | 5/2004 | Kang ................... G01S 19/23 455/67.11 |
| 2006/0040654 | A1 | 2/2006 | Moore et al. |
| 2006/0046710 | A1 | 3/2006 | Lohlein et al. |
| 2007/0153720 | A1* | 7/2007 | Baglin ................. H04W 24/06 370/328 |
| 2010/0113011 | A1* | 5/2010 | Gregg .................. H04W 24/06 455/425 |
| 2011/0092202 | A1 | 4/2011 | Mattisson et al. |
| 2012/0214473 | A1* | 8/2012 | Li ........................ H04W 24/06 455/419 |
| 2014/0162604 | A1 | 6/2014 | Otowa et al. |

FOREIGN PATENT DOCUMENTS

JP 4261258 B2 2/2009

OTHER PUBLICATIONS

U.S. Office action for U.S. Appl. No. 14/076,388 dated Feb. 13, 2015.

* cited by examiner

Primary Examiner — Frantz Bataille
(74) Attorney, Agent, or Firm — Pearne & Gordon LLP

(57) ABSTRACT

At the beginning of the operation of a mobile terminal 1 to be tested, link establishment means 211 performs a process of establishing a link to the mobile terminal 1. When the link is established, test mode change means 213 transmits a message "downlink Direct Transfer (Activate RB Test Mode)" for setting test mode connection from a base station, returns a response message to a message transmitted from the mobile terminal 1 to be tested, thereby changing the mobile terminal 1 to be tested to a test mode, and performs a transmission and reception test.

3 Claims, 4 Drawing Sheets

MOBILE TERMINAL TEST DEVICE AND METHOD

TECHNICAL FIELD

The present invention relates to a technique for effectively testing a mobile terminal, such as a mobile phone or a smart phone which performs wireless communication with a base station.

BACKGROUND ART

In a mobile terminal communication system, a mobile terminal in the service area of the base station receives radio waves from the base station when it is turned on or it is reset, transmits a request to the base station that communication therebetween can be performed, and changes to a state in which it can communicate with the base station (link established state). Then, the mobile terminal notifies the base station of its unique information and performs an authentication and location registration process for registering the existence area of the mobile terminal to the network including the base station. Then, the mobile terminal performs a link open process and changes to an idle state. Then, when communication, such as call connection (the reception of a call) or call transmission from the base station, is needed, the mobile terminal changes to a communication state with the base station.

In the prior art, when a test device (which is also referred to as a pseudo-base station apparatus) tests the mobile terminal which communicates with the base station, message exchange is performed with the mobile terminal to be tested by the same process as that performed by the base station, as shown in the example of FIG. 4.

That is, at the beginning of the operation, a mobile terminal 1 transmits a message Mu1=rrc Connection Request (establishment Cause: registration) for requesting communication with the base station in order to register the location. A test device 10 transmits a message Md1=rrc Connection Setup for designating, for example, a channel used for communication with the mobile terminal 1, in response to the request. Hereinafter, Mu (number) is referred to as a message transmitted by the mobile terminal 1 and Md (number) is referred to as a message transmitted by the test device (pseudo-base station apparatus) 10.

When receiving the message, the mobile terminal 1 sets, for example, the channel used for communication on the basis of the designated information and transmits a message Mu2=rrc Connection Setup Complete which indicates the completion of the setting. Then, the mobile terminal 1 transmits a connection request message Mu3=initial Direct Transfer (Attach request) for location registration.

The process from Mu1 to Mu2 is a link establishment process and Mu3 is a connection request process. However, here, it is assumed that a link is established when the process from Mu1 to Mu3 is performed. After the establishment of the link is completed, the test device proceeds to an authentication process for the mobile terminal 1.

That is, the test device 10 transmits a message Md2=downlink Direct Transfer (Authentication and ciphering request) indicating the value of a random number (RAND) which is used in the authentication calculation of the mobile terminal 1. When receiving the message, the mobile terminal 1 performs a predetermined operation using the RAND value and its own information, inserts the calculation result into a message Mu4=uplink Direct Transfer (Authentication and ciphering response), and returns the message.

The test device 10 determines whether the calculation result is correct. When it is determined that the calculation result is correct, the test device 10 transmits a message authentication use start notification message Md3=security Mode Command. The mobile terminal returns a message Mu5=security Mode Complete which indicates the reception of the message.

Then, the test device 10 transmits a message Md4=downlink Direct Transfer (Identity request: IMSI) for inquiring about a user identification number IMSI (International Mobile Subscriber Identity) which is allocated to each user of the mobile terminal. The mobile terminal 1 returns a response message Mu6=uplink Direct Transfer (Identity response). In addition, the IMSI and key information (Authentication key) unique to the user which is used for authentication are stored in a SIM of the mobile terminal.

Then, the test device 10 transmits a message Md5=downlink Direct Transfer (Identity request: IMEI) for inquiring about a terminal identification number IMEI (International Mobile Equipment Identity) which is allocated to each mobile terminal. The mobile terminal 1 returns a response message Mu7=uplink Direct Transfer (Identity response).

Then, the test device 10 transmits a message Md6=downlink Direct Transfer (Attach accept) for accepting a location registration request (Attach request). The mobile terminal 1 returns a response message Mu8=uplink Direct Transfer (Attach Complete).

The authentication and location registration of the mobile terminal 1 is completed by these processes. The test device 10 transmits a message Md7=rrc Connection Release for designating the opening of the channel in order to open the link. The mobile terminal 1 outputs a response message Mu9=rrc Connection Release Complete and then enters the idle state.

Then, the test device 10 transmits a connection request message Md8=paging Type 1 for a test to the mobile terminal 1 which is in the idle state. When receiving the message, the mobile terminal 1 returns a message Mu10=rrc Connection Request (establishment Cause: terminating Conversational Call) for requesting communication with the test device 10 again.

Then, the test device 10 transmits a message Md9=rrc Connection Setup for designating, for example, a channel used for communication with the mobile terminal 1.

When receiving the message, the mobile terminal 1 sets, for example, the channel used for communication on the basis of the designated information and transmits a message Mu11=rrc Connection Setup Complete which indicates the completion of the setting. Then, the mobile terminal 1 transmits a connection request message Mu12=initial Direct Transfer (paging response).

The exchange of the messages Md8 to Mu12 is a link re-establishment process for a test. After the link establishment is completed, the test device 10 transmits a message Md10=downlink Direct Transfer (Authentication and ciphering request) indicating a RAND value which is used for authentication calculation in order to authenticate the mobile terminal 1. When receiving the message, the mobile terminal 1 performs predetermined calculation using authentication key information (Authentication key) and the RAND value and returns a message Mu13=uplink Direct Transfer (Authentication and ciphering response) including the calculation result.

Then, the test device 10 determines whether the calculation result is correct. When it is determined that the calculation result is correct, the test device 10 transmits a message authentication use start notification message Md11=security Mode Command. When receiving the message, the mobile terminal 1 returns a message Mu14=security Mode Complete which indicates the reception of the message.

The mobile terminal 1 to be tested is authenticated by the exchange of the messages Md10 to Mu14. When the authentication ends, the test device 10 transmits a message Md12=downlink Direct Transfer (Activate RB Test Mode) for setting test mode connection to the mobile terminal 1. When receiving the message, the mobile terminal 1 returns a response message Mu15=uplink Direct Transfer (Activate RB Test Mode Complete).

Then, the test device 10 transmits a message Md13=radio Bearer Setup which designates, for example, the channel used for data communication for a test. When receiving the message, the mobile terminal 1 returns a message Mu16=radio Bearer Setup Complete which indicates the completion of the setting.

Then, the test device 10 transmits a message Md14=downlink Direct Transfer (Close UE Test Loop) for setting the type of the test mode to the mobile terminal 1. When receiving the message, the mobile terminal 1 returns a message Mu17=uplink Direct Transfer (Close UE Test Loop Complete).

After the mobile terminal 1 changes to the test mode in this way, the transmission and reception test is performed for the mobile terminal 1. Examples of the test include tests for the transmission functions of the mobile terminal 1, such as a transmission power test, an EVM test, and an ACLR test, and tests for the reception functions of the mobile terminal 1, such as a reception sensitivity test and a loop-back test.

As such, the test device according to the prior art changes the mobile terminal to the state in which the mobile terminal can be tested by the same process as the communication process between the base station and the mobile terminal and then tests the mobile terminal. In recent years, the processing speed and function of the mobile terminal have increased and a multi-band mobile terminal has been developed. As a result, the test time increases due to an increase in the number of test items. When the mobile terminals are tested one by one in a manufacturing line, there is a strong demand for a technique capable of effectively performing the test.

As one of the test methods, the following Patent Document 1 discloses a technique which stores information required for location registration in a mobile terminal in advance, omits a location registration process between a test device and the mobile terminal, and tests the mobile terminal in an idle state.

PRIOR ART DOCUMENT

Patent Document

[Patent Document 1] U.S. Pat. No. 7,177,600

DISCLOSURE OF THE INVENTION

Problem that the Invention is to Solve

However, it is useless to store the information required for the location registration process which is used only for a test in the mobile terminal, as in the above-mentioned Patent Document 1. Therefore, the storage capacity of the memory is wasted. In addition, since the technique can be applied only to the mobile terminal which stores the location registration information for a test in advance, it has a compatibility problem.

In addition, as shown in the chart of FIG. 4, after the location registration process, the link is opened and the mobile terminal enters the idle state. Then, the link is re-established and the mobile terminal changes to the test mode. Therefore, even though the location registration process is omitted as in the above-mentioned Patent Document 1, it takes a considerable amount of time until the test is performed and it is difficult to effectively test the mobile terminal during a manufacturing process.

In the test, it is necessary to use a test SIM whose stored information is known in order to authenticate the mobile terminal. However, there is a strong demand for a test in the state in which the actual SIM (Subscriber Identity Module) which stores information for specifying user information, such as the phone number of the mobile terminal is mounted, in order to check the operation of an M2M module before shipment. Since the parameters stored in the actual SIM are unknown, failure occurs in the test. In particular, when IMSI, which is the unique value of the SIM, or key information (Authentication key) used for authentication is unclear, the unclear IMSI or key information has a great effect on the test.

For example, when being connected to the mobile terminal in the idle state, the base station transmits a paging to the mobile terminal. However, the mobile terminal in the idle state intermittently receives the paging only at the time calculated from the IMSI. Therefore, the base station acquires the IMSI stored in the SIM of the mobile terminal and performs authentication with reference to the calculation result using the key information stored in the SIM. Therefore, the test device needs to re-establish the link (call connection) using the authentication process according to the above-mentioned sequence and it is difficult to test the mobile terminal provided with the actual SIM whose stored content is unknown.

The invention has been made in order to solve the above-mentioned problems and an object of the invention is to provide a mobile terminal test device and method which does not need to store unnecessary test information in a mobile terminal in advance, rapidly changes the mobile terminal to a state in which the mobile terminal can be tested, without the time required for a location registration process, a link open process, a change to an idle state, or a link re-establishment process after an initial operation, does not require the link re-establishment process due to call connection in the idle state, and can be connected, without being aware of the content stored in a SIM.

Means for Solving the Problem

In order to achieve the object, according to a first aspect of the invention, there is provided a mobile terminal test device for testing a mobile terminal which transmits and receives a signal to and from a base station to perform a link establishment process and a location registration process at the beginning of an operation when power is turned on or a reset operation is performed, changes to an idle state after a link is opened, performs the link establishment process again in response to a connection request from the base station in the idle state, and performs communication through the base station. The mobile terminal test device includes link establishment means (211) for exchanging a message required for the link establishment with the mobile terminal at the beginning of the operation, test means (214) for performing a transmission and reception test for the mobile terminal, and test mode change means (213) for transmitting a message "downlink Direct Transfer (Activate RB Test Mode)" for setting test mode connection from the base station to the mobile terminal when the link establishment means establishes the link to the mobile terminal and making the mobile terminal return a response message to the message, thereby changing the mobile terminal to a test mode. The test means performs the transmission and reception test for the mobile terminal which is changed to the test mode by the test mode change means.

According to a second aspect of the invention, the mobile terminal test device according to the first aspect may further include pseudo-authentication means (212) for exchanging a message related to authentication with the mobile terminal when the link establishment means establishes the link to the mobile terminal. When the pseudo-authentication means completes the exchange of the message related to the authentication, the test mode change means may transmit the message "downlink Direct Transfer (Activate RB Test Mode)" for setting test mode connection from the base station to the mobile terminal.

According to a third aspect of the invention, there is provided a mobile terminal test method for testing a mobile terminal which transmits and receives a signal to and from a base station to perform a link establishment process and a location registration process at the beginning of an operation when power is turned on or a reset operation is performed, changes to an idle state after a link is opened, performs the link establishment process again in response to a connection request from the base station in the idle state, and performs communication through the base station. The mobile terminal test method includes a step of exchanging a message required for the link establishment with the mobile terminal at the beginning of the operation, a step of performing a transmission and reception test for the mobile terminal, and a step of transmitting a message "downlink Direct Transfer (Activate RB Test Mode)" for setting test mode connection from the base station to the mobile terminal when the link to the mobile terminal is established and making the mobile terminal return a response message to the message, thereby changing the mobile terminal to a test mode. In the step of performing the transmission and reception test, the transmission and reception test is performed for the mobile terminal which is changed to the test mode.

According to a fourth aspect of the invention, the mobile terminal test method according to the third aspect may further include a step of exchanging a message related to authentication with the mobile terminal when the link to the mobile terminal is established. When the exchange of the message related to the authentication is completed, the message "downlink Direct Transfer (Activate RB Test Mode)" for setting test mode connection from the base station may be transmitted to the mobile terminal.

Advantage of the Invention

As such, in the invention, at the beginning of the operation of the mobile terminal to be tested, a process for establishing a link to the mobile terminal is performed. When the link is established, the test device transmits a message "downlink Direct Transfer (Activate RB Test Mode)" for setting test mode connection from the base station and returns a response message to the message which is transmitted from the mobile terminal to be tested, thereby changing the mobile terminal to be tested to the test mode. Then, the transmission and reception test is performed for the mobile terminal.

Therefore, it is possible to change the mobile terminal to a state in which the mobile terminal can be tested, without performing necessary processes from the location registration process which is generally performed in communication with the base station at the beginning of the operation of the mobile terminal to the idle state and processes from the idle state to the re-establishment of the link. As a result, it is possible to significantly reduce the test time.

In addition, since the processes from the idle state to the re-establishment of the link are not needed, the test is performed, without being aware of the information stored in the SIM of the mobile terminal. It is possible to test a mobile terminal provided with a SIM whose stored information is unknown at a short time, in addition to the SIM for a test.

Since the pseudo-authentication process after the link establishment is omitted, it is possible to further reduce the test time.

BEST MODE FOR CARRYING OUT THE INVENTION

Hereinafter, embodiments of the invention will be described with reference to the drawings.

Figure 1:
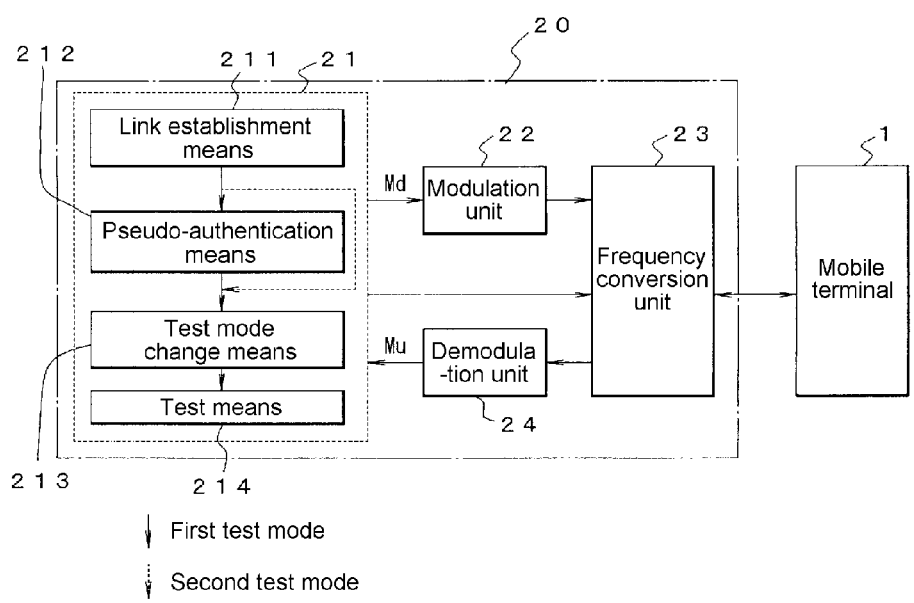
FIG. 1 is a diagram illustrating the structure of an embodiment of the invention.

FIG. 1 is a diagram illustrating the structure of a mobile terminal test device 20 according to an embodiment of the invention.

The mobile terminal test device 20 communicates with a mobile terminal using a WCDMA system or a TD-SCDMA system and includes a test control unit 21, a modulation unit 22, a frequency conversion unit 23, and a demodulation unit 24.

The test control unit 21 outputs a message Md or a test data signal to be transmitted to a mobile terminal 1 to be tested according to a predetermined sequence, analyzes a data signal transmitted from the mobile terminal 1, and tests and evaluates the mobile terminal 1.

The modulation unit 22 performs a modulation process corresponding to the modulation system of the mobile terminal 1 for the output signal from the test control unit 21 and outputs the modulated signal to the frequency conversion unit 23.

The frequency conversion unit 23 converts the signal modulated by the modulation unit 22 into a signal in a frequency band which is used for communication with the mobile terminal 1 and transmits the converted signal to the mobile terminal 1 to be tested. In addition, the frequency conversion unit 23 converts the signal output from the mobile terminal 1 into a signal in a frequency band which is treated by the demodulation unit 24 and outputs the converted signal.

The demodulation unit 24 receives the signal which has been received from the mobile terminal 1 and then frequency-converted by the frequency conversion unit 23, performs a demodulation process corresponding to the modulation system of the mobile terminal 1 to demodulate a message Mu or data from the mobile terminal 1, and transmits the demodulated signal to the test control unit 21.

It is assumed that the frequency control of the frequency conversion unit 23 is performed by the test control unit 21.

The test control unit 21 includes link establishment means 211, pseudo-authentication means 212, test mode change means 213, and test means 214.

The link establishment means 211 performs a message exchange process for establishing a first link between the test device 20 and the mobile terminal 1 at the beginning of the operation of the mobile terminal 1.

The pseudo-authentication means 212 is used when it is difficult for the mobile terminal 1 to be tested to change to the test mode because the mobile terminal 1 does not pass an authentication process for information stored in a SIM and exchanges the message required for the authentication with the mobile terminal 1. However, the pseudo-authentication means 212 does not perform a determination process required for the actual data matching and transmits an authentication completion message in response to the information notified by the mobile terminal 1, without any conditions (pseudo-authentication).

When the link establishment is completed and the exchange of the message for the pseudo-authentication process is completed, the test mode change means 213 transmits a message "downlink Direct Transfer (Activate RB Test Mode)" for setting test mode connection from a base station and changes the mobile terminal 1 to be tested to the test mode. The change is premised on flexibility in the response of the mobile terminal to the transmitted message. In recent years, various mobile terminals have been manufactured which can exactly respond to the message transmitted from the base station in the unexpected mode and change to the test mode, with a link to the base station being established. The test device 20 according to this embodiment tests this type of mobile terminal 1.

However, examples of the mobile terminal 1 include a terminal which requires a process of notifying the calculation result using key information in the SIM to the base station and receiving a message indicating that authentication has succeeded from the base station and a mobile terminal in which the authentication can be omitted.

Therefore, in this embodiment, when the mobile terminal requiring authentication is tested, in a first test mode, the pseudo-authentication means 212 transmits a message "downlink Direct Transfer (Authentication and ciphering request)" for notifying, for example, a RAND value required for the authentication process by the base station and performs a pseudo-authentication process. Then, the process proceeds to a test mode connection setting step.

In the test of the mobile terminal in which the pseudo-authentication process can be omitted, in a second test mode, when the establishment of the link is completed, the message "downlink Direct Transfer (Activate RB Test Mode)" for setting test mode connection is transmitted, without performing the pseudo-authentication process. Then, the test device proceeds to the test mode connection setting step.

The test means 214 performs the transmission and reception test for the mobile terminal 1 which has changed to the test mode.

Figure 2:
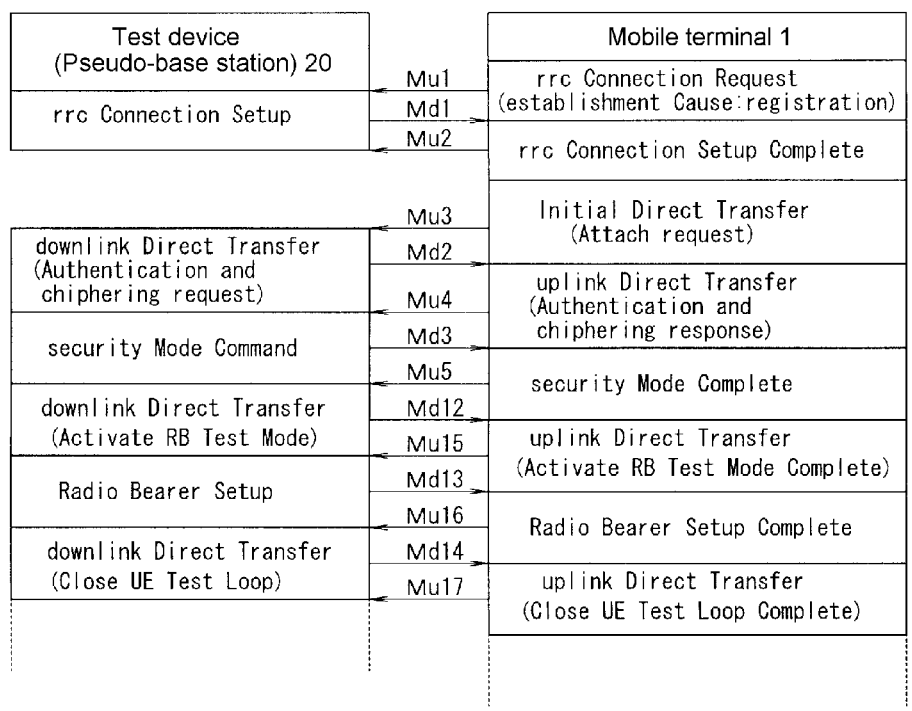
FIG. 2 is a chart illustrating the procedure of a process according to the embodiment.

FIG. 2 is a chart illustrating in detail the operation of the test device 20 when the mobile terminal requiring the pseudo-authentication process is tested. Next, the operation of the test device 20 will be described with reference to FIG. 2.

That is, at the beginning of the operation, the mobile terminal 1 transmits a message Mu1=rrc Connection Request (establishment Cause: registration) which requests communication with the base station in order to register the location. Then, the test device 20 transmits a message Md1=rrc Connection Setup which designates, for example, a channel used for communication with the mobile terminal 1, in response to the request.

When receiving the message, the mobile terminal 1 sets, for example, the channel used for communication on the basis of the designated information, transmits a message Mu2=rrc Connection Setup Complete which indicates the completion of the setting, and then transmits a connection request message Mu3=initial Direct Transfer (Attach request) for location registration.

The process from Mu1 to Mu2 is a link establishment process and Mu3 is a connection request process. However, here, it is assumed that a link is established after Mu1 to Mu3 are performed. After the establishment of the link is completed, a message Md2 (=Md10)=downlink Direct Transfer (Authentication and ciphering request) which indicates a RAND value used in authentication calculation is transmitted for the pseudo-authentication of the mobile terminal 1. When receiving the message, the mobile terminal 1 returns a message Mu4 (=Mu13)=uplink Direct Transfer (Authentication and ciphering response) for transmitting the calculation result.

Then, the test device 20 transmits a message authentication use start notification message Md3 (=Md11) security Mode Command, without being aware of the calculation result transmitted from the mobile terminal 1 to be tested. When receiving the message, the mobile terminal 1 returns a reception report message Mu5 (=Mu14)=security Mode Complete.

The pseudo-authentication of the mobile terminal 1 to be tested is performed by the exchange of the messages Md2 to Mu5. When the authentication ends, the test device proceeds to a message exchange process for location registration in the prior art. However, in this embodiment, when the authentication ends, the test device transmits a message Md12=downlink Direct Transfer (Activate RB Test Mode) for setting test mode connection to the mobile terminal 1. The mobile terminal 1 returns a response message Mu15=uplink Direct Transfer (Activate RB Test Mode Complete).

Then, the test device 20 transmits a message Md13=radio Bearer Setup which designates, for example, a channel used for data communication for a test. The mobile terminal 1 returns a message Mu16=radio Bearer Setup Complete which indicates the completion of the setting.

Then, the test device 20 transmits a message Md14=downlink Direct Transfer (Close UE Test Loop) for setting the type of the test mode to the mobile terminal 1. When receiving the message, the mobile terminal 1 returns a message Mu17=uplink Direct Transfer (Close UE Test Loop Complete).

After the mobile terminal 1 is changed to the test mode, the test device performs the transmission and reception test.

As such, the mobile terminal test device 20 according to the embodiment omits a location registration process, a link open process, a change to the idle state, and a link re-establishment process for the mobile terminal 1 at the beginning of the operation and changes to the test mode. Therefore, it is possible to significantly reduce the test time, as compared to the related art.

In addition, since the link re-establishment process due to call connection in the idle state is not needed, the value of the IMSI in the SIM is not considered. Even when key information in the SIM of the mobile terminal is unknown, the calculation result notified by the mobile terminal is not determined. Therefore, it is possible to test the mobile terminal provided with the actual SIM whose stored content is unknown in a short period of time.

In the above-described embodiment, in the TD-SCDMA system, it is possible to reduce a time of 3 to 4 seconds required for the location registration process and the link open process and a paging transmission waiting time (an interval of 640 ms to 2560 ms at which the terminal receives a paging) due to intermittent reception in the idle state.

Figure 3:
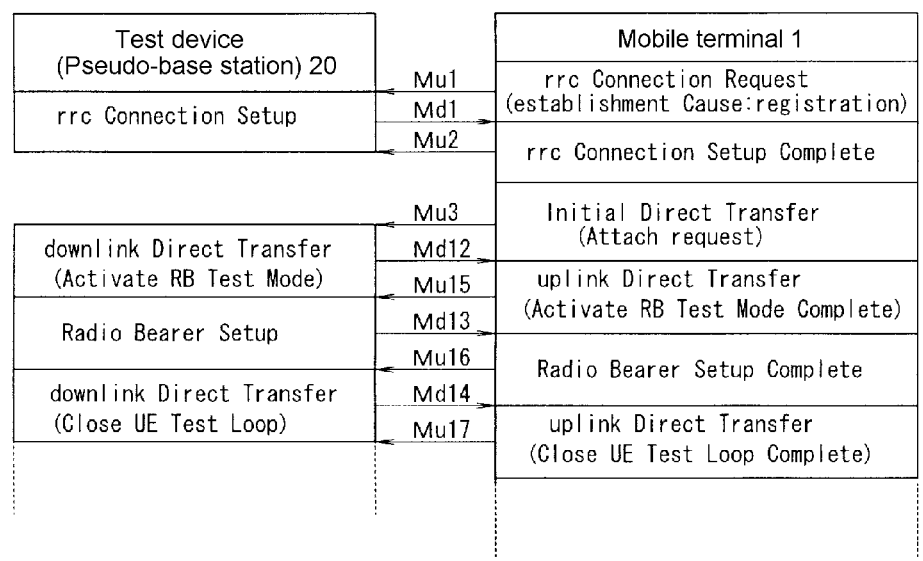
FIG. 3 is a chart illustrating the procedure of another process according to the embodiment.

FIG. 3 is a chart illustrating the operation of the test device 20 when the mobile terminal which can omit SIM authentication is tested. In the chart, the exchange of the messages Md2, Md3, Mu4, and Mu5 for pseudo-authentication in the chart shown in FIG. 2 is omitted. When the link establishment process from Mu1 to Mu3 is completed at the beginning of the operation, the test device immediately transmits the message Md12=downlink Direct Transfer (Activate RB Test Mode) for setting test mode connection to the mobile terminal 1 to change the mobile terminal 1 to the test mode, without performing the pseudo-authentication process. Then, the mobile terminal 1 is tested by the same process as that in FIG. 2.

Therefore, in this case, in addition to the location registration process, the link open process, the idle state, and the link re-establishment process, the pseudo-authentication process for the mobile terminal 1 at the beginning of the operation can be omitted. Therefore, it is possible to further reduce the test time.

Figure 4:
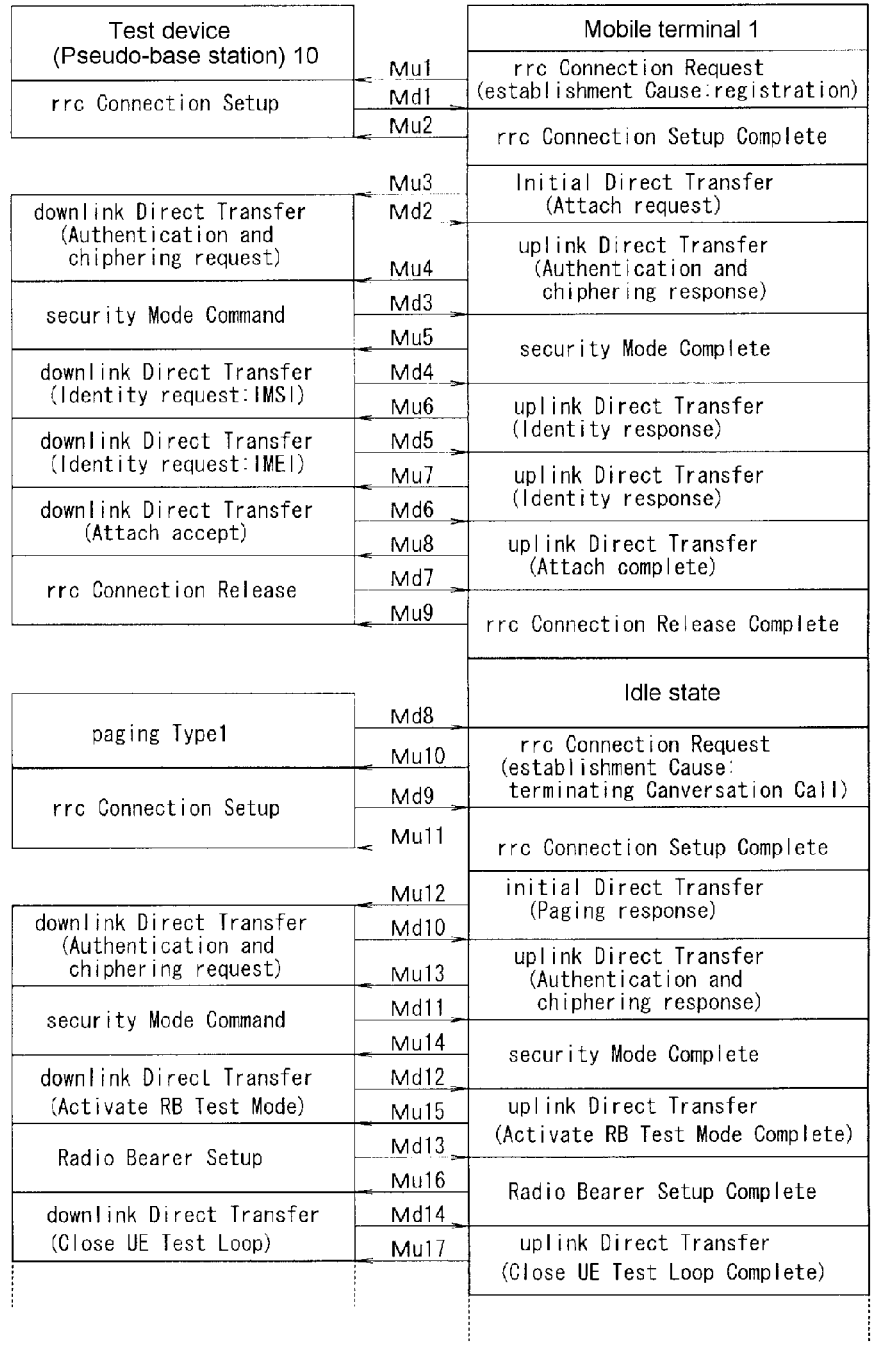
FIG. 4 is a chart illustrating the procedure of a process of a device according to the prior art.

The user can perform a mode designation operation using an operation unit (not shown) to arbitrarily designate one of the two test modes. In addition to the two simplified test modes, the test mode (third test mode) according to the prior art shown in FIG. 4 can be executed. It is possible to designate any one of the first to third test modes according to flexibility in the mode change of the mobile terminal to be tested by the messages. According to this structure, it is possible to respond to mobile terminals manufactured by many different manufacturers. In addition, it is possible to achieve a test device which can respond to multiple types of apparatuses with different functions manufactured by the same manufacturer and has high compatibility.

The invention can be used to reduce the connection time when the communication system is changed from LTE to WCDMA/TD-SCMA by circuit switch fall-back (CSFB: a technology which enables a terminal on an LTE network to use another system, such as WCDMA, when it uses a CS connection service such as the transmission and reception of a call).

DESCRIPTION OF REFERENCE NUMERALS AND SIGNS

20: MOBILE TERMINAL TEST DEVICE
21: TEST CONTROL UNIT
22: MODULATION UNIT
23: FREQUENCY CONVERSION UNIT
24: DEMODULATION UNIT
211: LINK ESTABLISHMENT MEANS
212: PSEUDO-AUTHENTICATION MEANS
213: TEST MODE CHANGE MEANS
214: TEST MEANS

What is claimed is:

1. A mobile terminal test device for testing a mobile terminal serving as a mobile terminal test target which transmits and receives a signal to and from a base station to perform a link establishment process, a location registration process, and an opening link process at the beginning of an operation when power is turned on or a reset operation is performed, changes to an idle state after a link is opened, performs a link re-establishment process in response to a connection request from the base station in the idle state, and performs communication through the base station, comprising:

link establishment means for exchanging a message required for the link establishment with the mobile terminal test target at the beginning of the operation;

test means for performing a transmission and reception test for the mobile terminal test target; and test mode change means for transmitting a message "downlink Direct Transfer (Activate RB Test Mode)" for setting test mode connection from the base station to the mobile terminal test target when the link establishment means establishes the link to the mobile terminal test target and for making the mobile terminal test target return a response message to the message, thereby changing the mobile terminal test target to a test mode without performing the location registration process, the opening link process, and the re-establishment process that is performed on the mobile terminal test target in the idle state, wherein the test means performs the transmission and reception test for the mobile terminal test target which is changed to the test mode by the test mode change means.

2. The mobile terminal test device according to claim 1, further comprising:

pseudo-authentication means for exchanging a message related to authentication with the mobile terminal test target when the link establishment means establishes the link to the mobile terminal test target, wherein, when the pseudo-authentication means completes the exchange of the message related to the authentication, the test mode change means transmits the message "downlink Direct Transfer (Activate RB Test Mode)" for setting test mode connection from the base station to the mobile terminal test target.

3. The mobile terminal test device according to claim 1, wherein the test mode change means transmits the message "downlink Direct Transfer (Activate RB Test Mode)" for setting test mode connection from the base station to the mobile terminal test target when the mobile terminal test target returns a message "security Mode Complete".

* * * * *